(12) United States Patent
Tietz et al.

(10) Patent No.: US 7,519,489 B2
(45) Date of Patent: Apr. 14, 2009

(54) DETERMINATION OF A JITTER PROPERTY OF A SIGNAL

(75) Inventors: Guenter Tietz, Nufringen (DE);
Joachim Moll, Herrenberg (DE);
Marcus Mueller, Stuttgart (DE)

(73) Assignee: Agilent Technologies, Inc., Santa Clara, CA (US)

( * ) Notice: Subject to any disclaimer, the term of this patent is extended or adjusted under 35 U.S.C. 154(b) by 2 days.

(21) Appl. No.: 11/519,587

(22) Filed: Sep. 12, 2006

(65) Prior Publication Data
US 2007/0098126 A1 May 3, 2007

(30) Foreign Application Priority Data
Oct. 28, 2005 (EP) .................. 05110168

(51) Int. Cl.
*G01R 29/26* (2006.01)
(52) U.S. Cl. .............. 702/69; 702/79; 375/226; 324/617; 324/620
(58) Field of Classification Search .......... 702/57, 702/66, 69, 79, 89, 106; 375/226, 227; 324/613, 324/617, 620, 622, 624–626; 370/516
See application file for complete search history.

(56) References Cited

U.S. PATENT DOCUMENTS

| | | | |
|---|---|---|---|
| 4,074,358 A | 2/1978 | Caputo et al. | |
| 4,677,388 A * | 6/1987 | Morrison | 327/78 |
| 6,356,850 B1 * | 3/2002 | Wilstrup et al. | 702/69 |
| 6,768,954 B2 * | 7/2004 | Niijima | 702/69 |
| 6,832,172 B2 * | 12/2004 | Ward et al. | 702/69 |
| 6,931,335 B2 * | 8/2005 | Mueller | 702/69 |
| 2003/0081667 A1 | 5/2003 | Camnitz et al. | |
| 2004/0146097 A1 | 7/2004 | Jungerman et al. | |
| 2006/0047450 A1 * | 3/2006 | Tabatabaei et al. | 702/69 |

FOREIGN PATENT DOCUMENTS

| JP | 11248768 A * | 9/1999 |
|---|---|---|
| WO | WO 99/39216 | 8/1999 |

OTHER PUBLICATIONS

Jitter Analysis: The dual-Dirac Model, RJ/DJ, and Q-Scale, Agilent Technologies, Jun. 21, 2005, pp. 1-16.
European Search Report dated, Feb. 20, 2006.

* cited by examiner

*Primary Examiner*—Manuel L Barbee
(74) *Attorney, Agent, or Firm*—Marc Bobys (57) ABSTRACT

Determining a jitter property of a signal with a repetitive bit sequence of a plurality of bits includes setting a sample point at a first sampling position relative to a first transition within the bit pattern, assigning a set of digital values to comparison results of the digital signal with a threshold at the set sample point for a plurality of repetitions of the bit sequence, determining a distribution value on the base of the sum of the assigned digital values, shifting the sample point by a time increment, iteratively repeating determining the distribution value until the sample point has reached a second sampling position, determining from the distribution values a distribution function over the sample points, and determining the jitter property by using the distribution function.

13 Claims, 5 Drawing Sheets

DETERMINATION OF A JITTER PROPERTY OF A SIGNAL

This application claims priority from European Patent Application No. 05110168.1, filed on 28, Oct. 2005, which is incorporated by reference in its entirety.

BACKGROUND

The present invention relates to the processing of a signal in order to determine jitter properties of the signal.

Jitter is a major cause for bit errors in digital communication systems. Jitter describes timing aberrations of a signal from a predefined signal course, e.g. delays of a signal caused by a lossy transmission channel. Bit errors occur if a receiver of a digital communication system detects a logical zero in a received bit stream instead of a logical one or vice versa. A measure for bit errors in digital communication systems is the bit error ratio—BER.

Particularly, the BER depends on the quality of a received signal containing digital data. Receivers of digital communication systems are adapted to sample the received signal with a predetermined sampling rate. However, jitter of the received signal may cause a bad sampling of the digital data transmitted with the received signal causing bit errors.

The theoretical model of total jitter—TJ—distinguishes between random jitter—RJ—and deterministic jitter—DJ. RJ is caused by thermal and noise effects. Thus, it is unbounded and may be described by a Gaussian probability density function. In contrast to RJ, DJ is bounded, i.e., it has definite amplitude limits and is by nature a peak-to-peak value. DJ is further distinguished in periodic jitter—PJ—, bounded uncorrelated jitter—BUJ—, and data dependent jitter—DDJ.

DDJ is a function of bit patterns and further distinguished in Duty Cycle Distortion—DCD—and Inter-Symbol Interference—ISI. ISI is usually caused by long and short bit cycles and results from bandwidth limitations or from loss within transmission lines while DCD is caused by voltage offsets between differential inputs and differences between transition times in a system.

Until now Jitter decomposition is known using a Real Time or Sampling Scope, as described in the publication "Jitter Analysis: The dual-Dirac Model, RJ/DJ, and Q-Scale"-White Paper, 21 Jun. 2005.

State of the Art for Bit Error Ratio Testers—BERT—is separating RJ and DJ using a BERT scan methodology. Such BERT might also be used to measure TJ, using a so-called Optimized BERT Scan Method.

SUMMARY

It is an object of the present invention to provide an improved processing of a signal in order to determine jitter properties of the signal. The object is solved by the independent claims. Preferred embodiments are shown by the dependent claims.

According to embodiments of the invention, a signal may be processed for determining jitter by determining the most likely transition points of the signal. The term "most likely transition point" means any predetermined sample or sampling point of a transition of the signal which is determined depending on a condition which is the same for all transitions of the signal. Typically, the most likely transition point is the sample point of a transition of the signal with a predetermined value, for example with a certain bit error ratio—BER—, e.g. a BER of about 50%. The determined most likely transition point may then be used to analyze the signal for jitter, particularly data dependent jitter. The determination of the most likely transition point according to the invention allows to analyze a signal for jitter at relatively low computing costs, particularly allows to calculate DDJ, ISI, and DCD like in a digital communications analyzer with jitter analysis. Thus, the invention may be advantageously applied in a bit error ratio tester—BERT—which has a different measurement principle than a digital communications analyzer with jitter analysis.

According to an embodiment of the invention, a jitter property of a digital signal with a repetitive bit sequence of a plurality of bits is determined by setting a sample point at a first sampling position relative to a first transition within the bit pattern, taking samples at the set sample point for a plurality of repetitions of the bit sequence, comparing each sample with a threshold, assigning a digital value to each comparison result.

According to an embodiment of the invention, the assigning a digital value comprises comparing the signal with a threshold and generating a comparison signal having of two levels, whereby the comparison signal has a first level if the threshold is greater than the signal, and else has a second level, setting a sample point at a transition of the signal for sampling the comparison signal, taking samples at the set sample point for several repetitions of the pattern, thereby obtaining a set of digital values.

According to a further embodiment of the invention, the assigning a digital value comprises taking a plurality of samples at the set sample point for several repetitions of the pattern, determining a digital value for each taken sample by comparing each sample with a threshold and assigning a digital value to each comparison result, thereby obtaining a set of digital values.

In a further embodiment, determining a distribution value on the base of the sum of the assigned digital values comprises shifting the sample point by a time increment, iteratively repeating the deriving of sets of digital values until the sample point has reached a second sampling position, determining from the distribution values a distribution function over the sample points, and determining the jitter property by using the distribution function.

In an embodiment a distribution value is determined by comparing the assigned digital values with a known bit of the digital signal relating to the transition point, counting the number of difference occurrences and relating this number to a number of repetitions (the same result might be obtained by taking each the sum of the assigned bits and subtracting the value of the corresponding known bit multiplied by the number of repetitions: In the following this ratio is also referred to as bit error ratio (BER).

In a further embodiment, the distribution value is simply determined by summing up the assigned values and relating the sum to the number of repetitions.

According to an embodiment of the invention, processing a signal in order to determine jitter of the signal with a repetitive bit pattern is provided, comprises:
a) setting a sample point at a transition of the signal for sampling the signal,
b) taking samples at the set sample point for several repetitions of the pattern and determining a digital value for each taken sample by comparing each sample with a threshold and assigning a digital value to each comparison result,
c) calculating a value from the samples taken in step b),
d) determining a most likely transition point of the sampled transition of the signal by means of the value calculated in step b).

According to a further embodiment of the invention, step d) may comprise the steps of:

d11) shifting the sample point by a time increment, d12) iteratively repeating steps b) to d11) until the sample point is shifted over the transition of the signal, d13) determining a distribution function of the taken samples over the sample points for the sampled transition, d14) analyzing the determined distribution for the most likely transition point by determining the time position of a sample point with a predetermined value of the distribution.

With this embodiment, a transition of the signal is "scanned" and a distribution of its samples over the shifted sample points, i.e., the time is determined. This allows to determine the most likely transition point with a high accuracy.

According to a further embodiment of the invention, the iteratively repeating of steps b) to d11) may continue until the sample point is shifted one bit. For example, the repeating may be stopped if the BER of the taken samples if about 100%. Then the sample point is shifted over the transition into the following or next bit.

According to a further embodiment of the invention, shifting the sample point by a time increment may be performed by a delay element the delay of which is incremented in step d11). Typically, the delay of the delay element is increased by a predetermined and constant delay time corresponding to the time shifting of the sample point with every repeating of steps b) to d11).

According to an alternative embodiment of the invention, shifting the sample point by a time increment may be performed by sampling the signal with a sampling data rate which has a predetermined fraction of the signal data rate. This is known as coherent sampling and avoids any delay elements which are not as accurate as the coherent sampling method and more difficult to adjust. Also, the adjusting of the delay of a delay element takes a certain time which is not required with the coherent sampling method.

According to a further embodiment of the invention, each sample may be stored in a capture memory and the determination of the distribution of the values calculated in step c) over the sample points for the sampled transition may be performed after taking the samples. According to this embodiment, a post-processing of the taken samples is performed. Thus, the sampling is not delayed by any processing steps. The taken samples must be only stored in the capture memory for the post-processing.

According to an alternative embodiment of the invention, a bit error counter may be used to calculate the distribution of the values calculated in step c) over the sample points for the sampled transition. According to this embodiment, the taken samples are processed during the sampling of the signal.

According to an alternative embodiment of the invention, step d) may comprise the steps of d21) determining the time position of the value calculated in step c) on a typical distribution for a transition of the signal, d22) determining the most likely transition point by determining the time position of a sample point with a predetermined value of the distribution depending on the position determined in step d21).

This method allows a fast determination of the most likely transition point and requires a less memory. In contrast to the method of completely "scanning" a transition according to the above embodiment, the determination of the most likely transition point with this method may be less accurate, since the most likely transition point is calculated depending on "one shot", i.e., on at least one taken sample. This resembles an approximation of the most likely transition point.

According to a further embodiment of the invention, the method may further comprise the steps of d) determining the most likely transition point for at least two different transitions of the signal, e) analyzing the signal for data dependent jitter by analyzing the distribution of the most likely transition points determined in step d).

At least two, or even more most likely transition points allow to analyze the signal for data dependent jitter, particularly for separating the data dependent jitter from the non data dependent jitter contained in the signal.

According to a further embodiment of the invention, in step e) data dependent jitter of the signal may be analyzed by calculating the difference between the earliest one of the most likely transition points of rising edge transitions and the latest one of the most likely transition points of falling edge transitions.

According to a further embodiment of the invention, in step e) duty cycle distortion jitter of the signal is analyzed by calculating the difference between the mean value of the time of the most likely transition points of rising edge transitions of the signal and the mean value of the time of the most likely transition points of falling edge transitions of the signal.

According to a further embodiment of the invention, in step e) inter-symbol interference jitter of the signal may be analyzed by determining the larger one of the difference between the time of the earliest most likely transition point and the latest most likely transition point from the rising edge transitions of the signal and of the difference between the time of the earliest most likely transition point and the latest most likely transition point from the falling edge transitions of the signal.

According to a further embodiment of the invention, each sample point may be set by automatically aligning it with a transition of the signal.

According to a further embodiment of the invention, in step c) the value may be calculated from the samples by calculating the bit error ratio—BER—of the samples, or by summing the taken samples. By calculating the BER, the distribution corresponds to an error distribution of the taken samples. By summing the taken samples, the distribution represents a data distribution.

According to a further embodiment of the invention, the most likely transition point may be defined as a sample point with a BER of about 50%.

According to an embodiment of the invention, a software program or product is provided, preferably stored on a data carrier, for executing any of the above embodiments of the method, when run on a data processing system such as a computer.

According to a further embodiment of the invention, a device for processing a signal in order to determine jitter of the signal with a repetitive bit pattern according to a method according to any of the above embodiments is provided, wherein the device comprises:

sampling means being adapted for setting a sample point at a transition of the signal for sampling the signal, for taking samples at the set sample point for several repetitions of the pattern and determining a digital value for each taken sample by comparing each sample with a threshold and assigning a digital value to each comparison result, and processing means being adapted for calculating a value of the samples taken by the sampling means, and for determining a most likely transition point of the sampled transition of the signal by means of the calculated value.

According to a further embodiment of the invention, the sampling means may comprise sample point setting means being adapted for setting a sample point, sample and hold means being adapted for taking a sample at a sample point set by the sample point setting means and for holding the taken sample, and sample point shifting means being adapted for shifting a sample point set by the sample point setting means by a time increment.

According to a further embodiment of the invention, the sample point shifting means may comprise a delay element with a variable delay time being adapted for delaying a sample pulse by one or more time increments, and delay control means being adapted for setting the delay time of the delay element.

According to an embodiment of the invention, a test instrument for processing a signal in order to determine data dependent jitter of the signal, such as a bit error ratio tester, is provided which comprises at least one channel being adapted for receiving an input signal containing a stream of bits, at least one of the above embodiments of the device for processing a signal in order to determine data dependent jitter of the signal, and display means for displaying the distribution of jitter of the received input signal.

Embodiments of the invention can be partly or entirely embodied or supported by one or more suitable software programs, which can be stored on or otherwise provided by any kind of data carrier, and which might be executed in or by any suitable data processing unit. Software programs or routines are preferably applied to a computer controlling the pin electronic according to embodiments of the invention.

BRIEF DESCRIPTION OF DRAWINGS

Other objects and many of the attendant advantages of embodiments of the present invention will be readily appreciated and become better understood by reference to the following more detailed description of embodiments in connection with the accompanied drawing(s). Features that are substantially or functionally equal or similar will be referred to by the same reference sign(s).

DETAILED DESCRIPTION

Briefly summarized, an embodiment of an algorithm for the measurement of data dependent jitter according to the invention applied in a BERT, in order to offer a jitter analysis capability, comprises the steps of capturing n x pattern length bits from a signal with a repetitive bit pattern, uploading an error capture memory of a BERT with the captured bits calculating the BER for each bit, shifting the sample point, and repeating the above steps until the sampling point is shifted by one bit.

Instead of the error capture memory, also a capture memory may be used, and a bit comparison for determining the BER of each bit may be done in post-processing. In the following, embodiments of the above briefly summarized basic algorithm for implementing an embodiment of the method according to the invention, are explained in detail.

Figure 1:
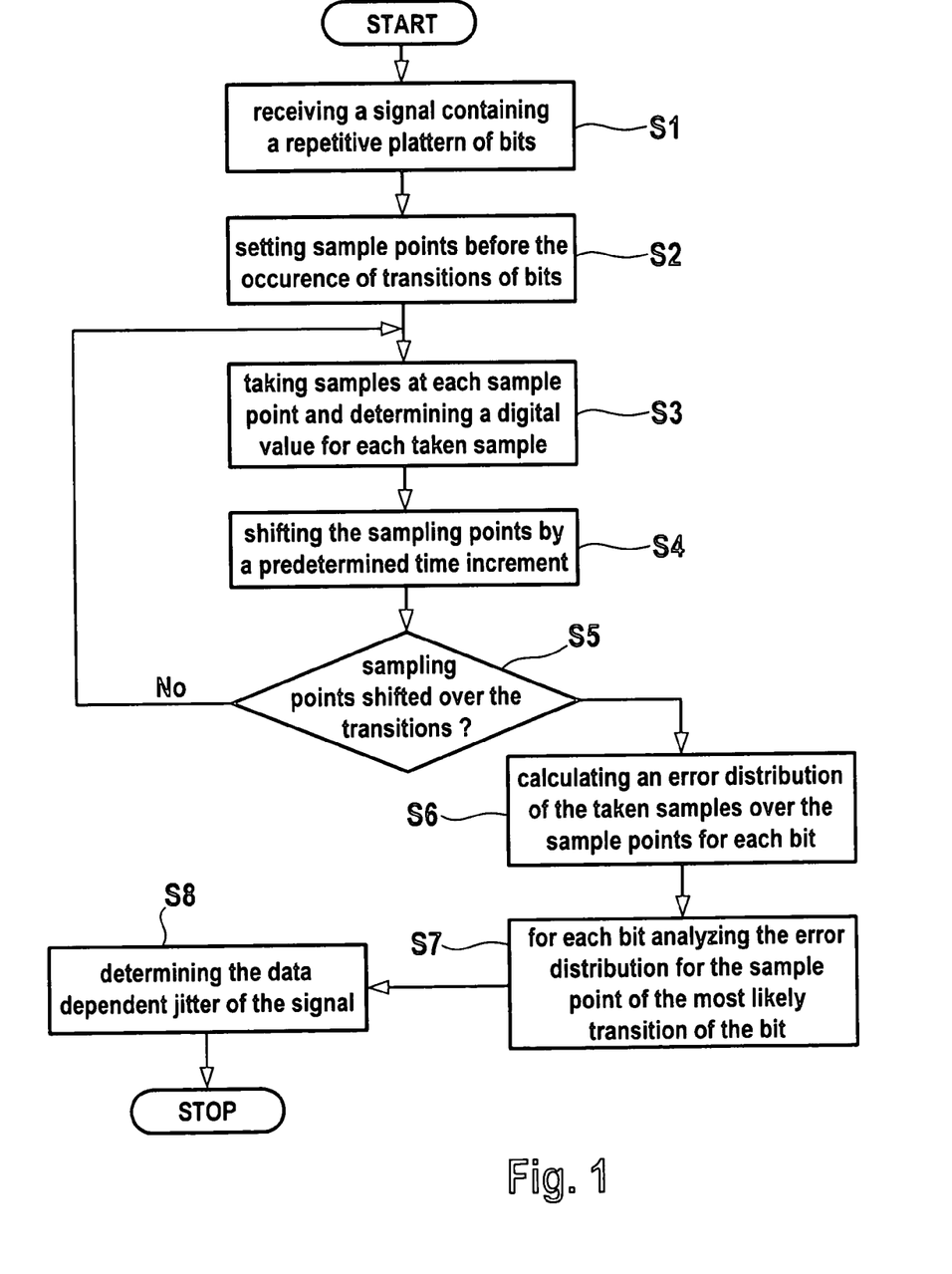
FIG. 1 shows a flow chart of an embodiment of the method for processing a signal in order to determine data dependent jitter of the signal according to the invention.

FIG. 1 shows a flow chart of a method for processing a signal in order to determine data dependent jitter of the signal, containing a repetitive pattern of bits, which may be implemented as a software program in a bit error ratio tester—BERT. The software program may be used to analyse a signal which is received by the BERT.

In step S1, a signal containing a repetitive pattern of, for example, 20 bits such as a K28.5 pattern is received. Other preferred patterns are pseudo random bit sequences which contain many variants of frequency components and, thus, may be used for testing purposes.

In step S2, for each of the 20 bits of the repetitive pattern, a sample point is set before the occurrence of a transition of the respective bit. In order to optimally set the sample points with regard to the transitions, they may be set for the first time by auto alignment. They should be set so far before the occurrence of transitions such that a transition including jitter effects may be fully sampled.

In step S3, 1000 samples are taken at each sample point being set in step S2. Thus, snapshots of 1000 periods of the repetitive pattern of bits of the received signal are taken at the same sample points. Furthermore, a digital value is determined for each taken sample by comparing each sample with a threshold and assigning different digital values to each comparison result. For example, each sample may be compared with a predetermined voltage level lying between the voltage levels of a logical high and a logical low. If the sample is larger than the predetermined voltage level, a logical high is assigned as digital value to the comparison result and vice versa. The digital values may be stored in a capture memory of the BERT. It should be noted that the threshold should as exactly as possible correspond to the mean value of the voltage levels of a logical high and a logical low. If the threshold deviates from the mean value, DCD may be contained in the analysis results.

In the following step S4, the sample points are shifted by a predetermined time increment. This may be done by using a delay element which implements the predetermined time increment. The predetermined time increment may depend on the granularity of the shifting of the sample points over the transitions. For example, each transition may be sampled 100 times which means that the predetermined time increment is a fraction of 100 of the entire shifting of each sample point over the transitions. If the entire shifting corresponds to the time period of a bit, the time increment may be a fraction of 100 of the bit time period.

In step S5, it is checked whether the sample points are already shifted over the transitions of the signal. The check may be done by a counter counting the number of shifts of the sampling points and comparing the count with a predetermined number of sample point shifts. It may also be done by comparing the last sample of the pattern with the repetitive pattern stored in a memory with expected values shifted by one bit. The comparison may be performed by a logical XOR function. If the resulting pattern contains only logical high, the sample points are already shifted over the transitions of the signal. Naturally, this method works only if a transition occurs, i.e., a logical low is followed by a logical one or vice versa.

If the sample points are not yet shifted over the transitions of the signal, the software program routine jumps back to step S3. Then, further samples are taken at the shifted sample points for 1000 periods of the repetitive pattern contained in the received signal and their digital values are determined and stored in the capture memory. Thus, by repeating steps S3 and S4 until the signal transition are "scanned", for each of the sampled signal transitions or bits, 1000 samples x number of sample points shifts are taken. The total number of samples stored in the capture memory is the number of samples taken from each period of the repetitive pattern of bits multiplied by the number of sampled periods of the repetitive pattern multiplied by the number of sample point shifts. For example, if 1000 periods of the repetitive pattern are sampled, 20 samples are taken from each period, and 100 shifts of the sampling points are performed, 1000×20×100=2000000 samples in total are stored in the capture memory. In addition to the capture memory, an error capture memory may be provided in which flags are stored for each sample indicating whether a bit sample corresponds to an expected bit or not.

In the following step S6, an error distribution for each transition or bit, respectively, of the taken samples over the sample points is calculated by determining whether the digital value assigned to each taken sample corresponds to an expected value of the bit or not. In detail, the repetitive pattern of bits is loaded in a memory with the expected values. Then, the stored digital values of each sampled period of the repetitive pattern are compared with the expected values and, for each of the bits of the repetitive pattern, the bit error ratio—BER—depending on the sample point is determined.

Figure 2:
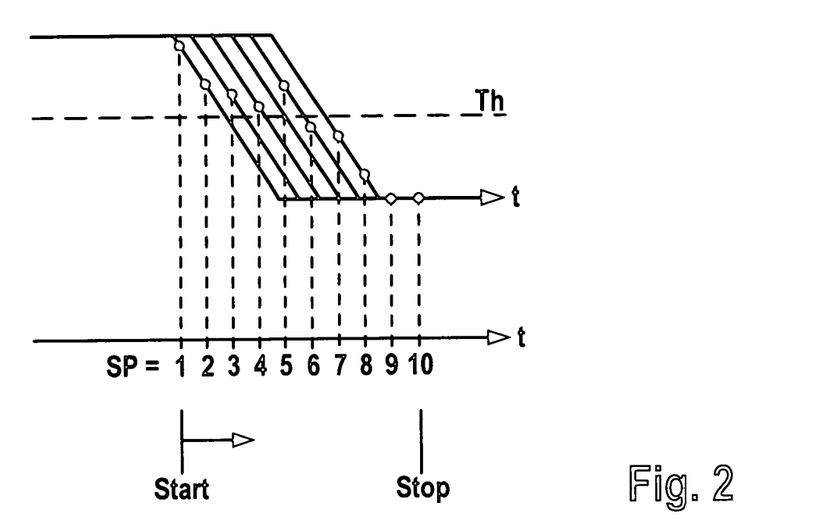
FIG. 2 shows diagram with a signal transition and the shifting of a sample point over the signal transition according to an embodiment of the invention.

FIG. 2 shows an example of a bit transition which is sampled at 10 consecutive sample points SP1 to SP10. Also, the threshold Th for determining a digital value for each taken sample is shown. In the shown example, a logical high is assigned as digital value to the samples taken at the sample points SP1 to SP5 while a logical low is assigned as digital value to the samples taken at the sample points SP6 to SP10. It should be noted that only one sample is taken at each sampling point. Thus, the BER is "0" for the taken at the sample points SP1 to SP5 and "1" for the samples taken at the sample points SP6 to SP10. Therefore, the BER depending on the sample point (error distribution) is a step function with a transition from "0" to "1" at the sampling points SP5 and SP6. The course of the BER over the sample points or the error distribution, respectively, becomes smoother and similar to a "S" due to jitter effects, if more samples are taken at each of the sampling points.

Figure 3:
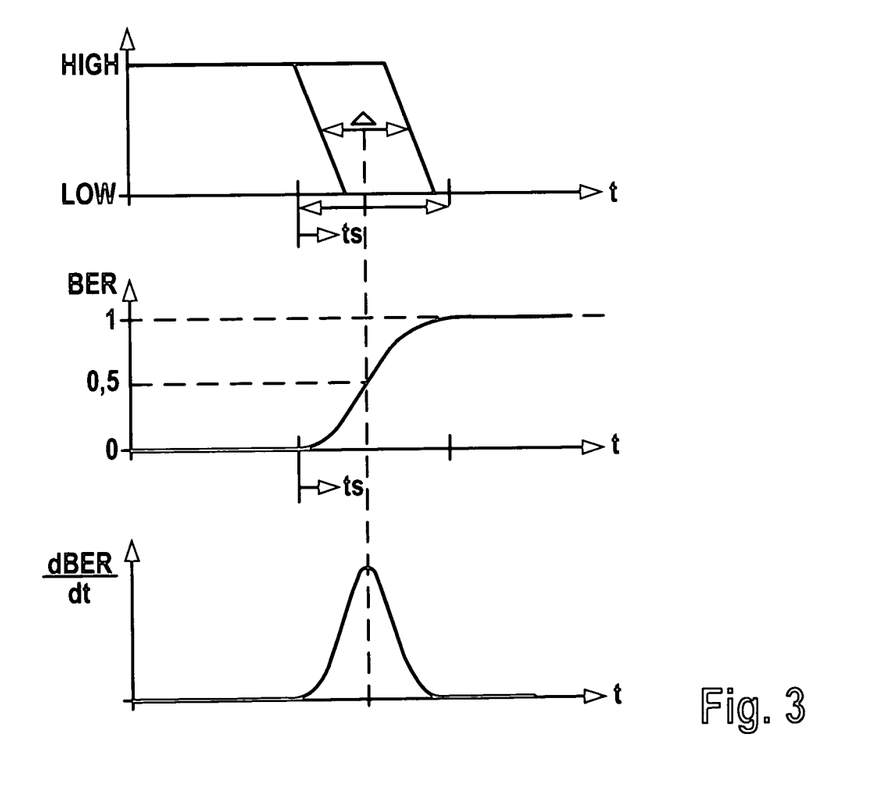
FIG. 3 shows in three diagrams a signal transition, a typical error distribution of the BER, and a typical derivation of the error distribution as it is calculated according to an embodiment of the invention.

FIG. 3 shows the typical course of the BER over the sampling points (time ts) or error distribution of a transition of a bit from a logical high to a logical low with a jitter distribution of Δ, respectively, if more samples are taken at each sample point. The course of the BER is similar to a "S" and has a smooth transition from "0" to "1". The sample point or time ts, at which the BER has a value of about "0.5" is the place where the transition occurs most likely. This is also the maximum of the jitter distribution which may be generated by building the derivative dBER/dt of the BER, as it is shown in the diagram of FIG. 3 at the bottom. It should be noted that the accuracy and resolution of the error distribution depends on the number of samples taken at each sampling point and the granularity with which the sample point is shifted over a transition. The more samples were taken and the finer the granularity of the sample point shifting is, the higher is the accuracy and the finer is the resolution of the error distribution or data distribution.

Continuing with step S7 of FIG. 1, the error distribution of each transition or bit, respectively, is analyzed for the sample point of the most likely transition of the bit. This is done by determining the sample point with a value of about 50% of the error distribution (as it is shown by means of one transition in FIG. 3). For example, the sample point is located from the number of sample points of each transition which is closest to a value of about 50%. The corresponding time of the located sample point represents the time when the transition most likely occurs. The most likely transition usually occurs at the time when the error or data distribution have their 50% threshold (in the following called most likely transition point). However, it is also possible to determine any other sample point defined as the most likely transition point, for example a sample point with a value of about 25% of the error distribution since this means only a constant offset everywhere which is subtracted out automatically.

Finally, in step S8, the data dependent jitter of the signal and of each transition or bit, respectively, is determined by analyzing the distribution of the most likely transition points determined in step S7. The process of analysing the distribution of the most likely transition points is explained in more detail with regard to the digrams shown in FIG. 5.

Figure 5:
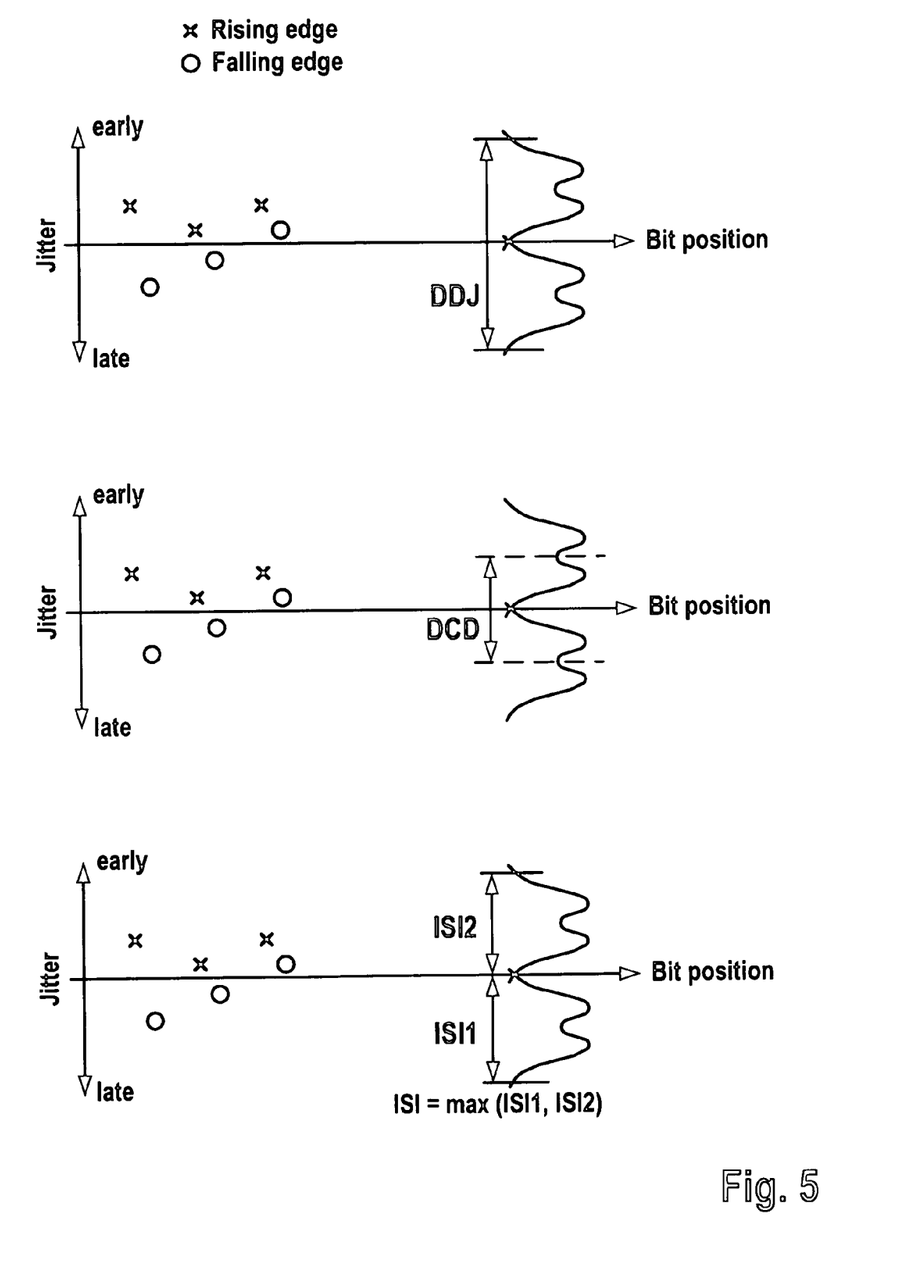
FIG. 5 shows three diagrams with samples taken from a signal containing a repetitive pattern of bits, derivations of the error distributions of the BER, and the determination of different types of data dependent jitter by analysing the derivations of the error distributions of the BER.

The top diagram in FIG. 5 shows how to determine the entire data dependent jitter—DDJ—of a signal containing a repetitive pattern of bits. In the diagram, the most likely transition points of the error distribution (in the following also briefly called mean values of the error distributions), as analysed in step S7, are marked as crosses X for the rising edges of bits and circles O for the falling edges of bits. On the right of the diagram, the distribution of the mean values of the rising edges and the distribution of the mean values of the falling edges are printed. DDJ can now be determined by calculating the difference between the time of the most likely transition point with the earliest edge and the time of the most likely transition point with the latest edge In the middle diagram of FIG. 5, it is shown how duty cycle distortion—DCD—jitter is determined. DCD is calculated as the absolute value of the average rising edge DDJ value minus the average falling edge DDJ value divided by the period of the bit rate. In detail, the difference between the time of the mean value of the most likely transition points from the rising transitions of bits of the signal and the time of the mean value of the most likely transition points from the falling transitions of bits of the signal is calculated. Then, the calculated difference is divided by the period of the bit rate.

Finally, the bottom diagram in FIG. 5 shows how intersymbol interference—ISI—jitter is determined. ISI is calculated as the larger of the rising edge DDJ or the falling edge DDJ. This is equivalent to measuring the total DDJ at the narrowest point of the crossing region of an eye diagram of the received and processed signal containing the repetitive pattern of bits. In detail, the larger one of the difference between the time of the most likely transition point with the earliest edge and the time of the most likely transition point with the latest edge from the rising transitions of bits of the signal and the difference between the time of the most likely transition point with the earliest edge and the time of the most likely transition point with the latest edge from the falling transitions of bits of the signal is calculated in order to achieve ISI.

Figure 4:
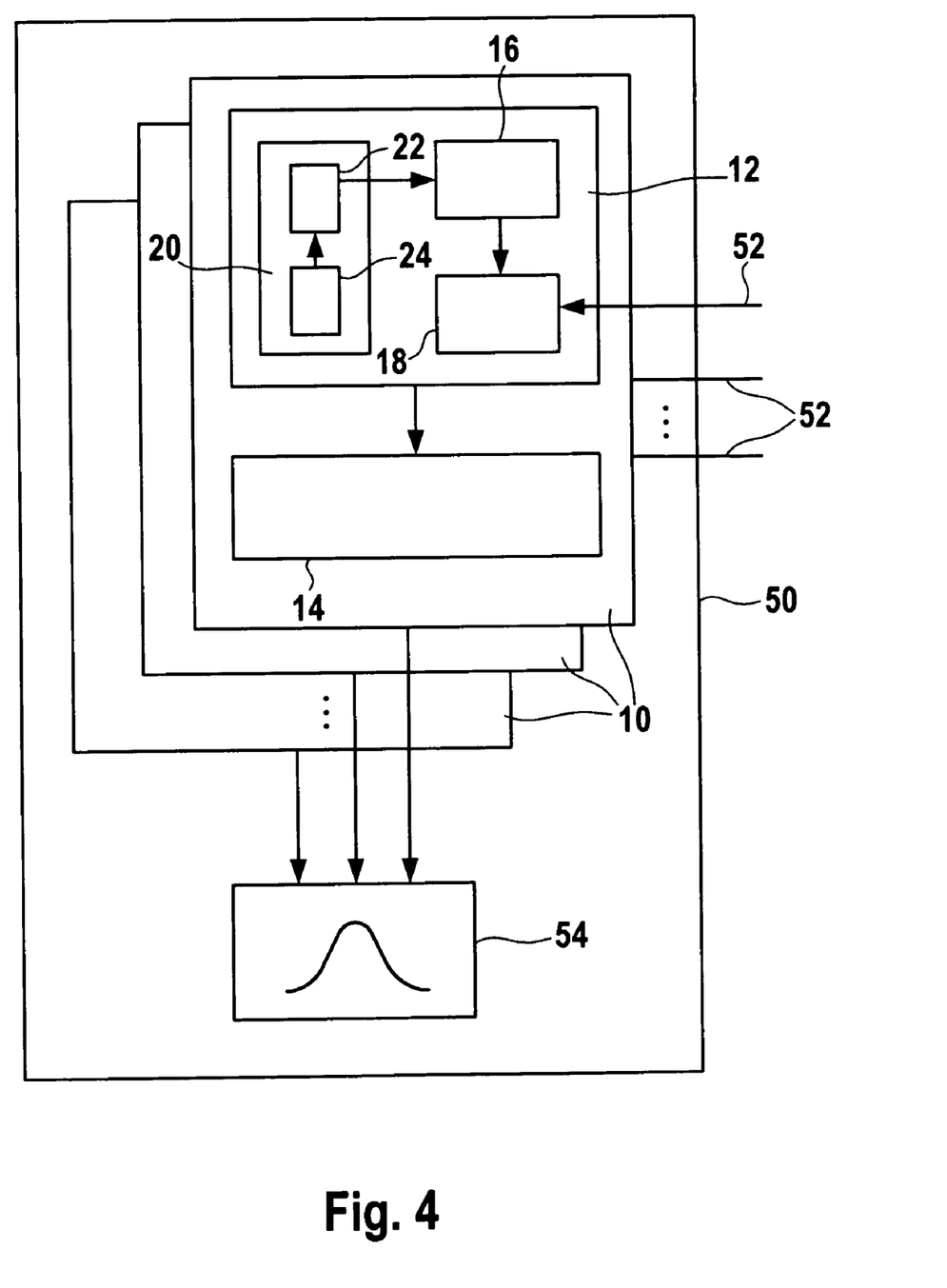
FIG. 4 shows an embodiment of a test instrument containing several devices for processing a signal in order to determine data dependent jitter of the signal according to the invention.

FIG. 4 shows an embodiment of a test instrument 50 for measuring and analysing signal with a high bit rate, e.g. with a bit rate in the range of GB/s. Such a test instrument 50 may be a bit error ratio tester—BERT—which serves for analysing the BER of a received signal. The test instrument 50 comprises several channels 52 being adapted for receiving input signals containing a stream of bits. Furthermore, it comprises several devices 10 for processing a signal in order to determine data dependent jitter of the signal, and display means 54 such as a TFT monitor for displaying the distribution of jitter of the received input signal. The instrument 50 also comprises processing means (not shown) such as a Personal Computer board and input means (not shown) for entering data for controlling the operation of the test instrument.

Each of the devices 10 comprises sampling means 12 containing sample point setting means 16 being adapted for setting a sample point, sample and hold means 18 being adapted for taking a sample at a sample point set by the sample point setting means 16 and for holding the taken sample, and sample point shifting means 20 being adapted for shifting a sample point set by the sample point setting means 16 by a time increment. The sample point shifting means 20 comprise a delay element 22 with a variable delay time being adapted for delaying a sample pulse by one or more time increments, and delay control means 24 being adapted for setting the delay time of the delay element.

The sampling means 12 communicate with processing means 14 being adapted for calculating an error distribution of the taken samples over the sample points by determining whether the digital value assigned to each taken sample corresponds to an expected value of the bit or not, for analysing the error distribution for the sample point of the most likely transition of the bit by determining the sample point with a value of about 50% or any other preset value of the error distribution, and for determining the data dependent jitter of the signal by analysing the error distribution.

Figure 6:
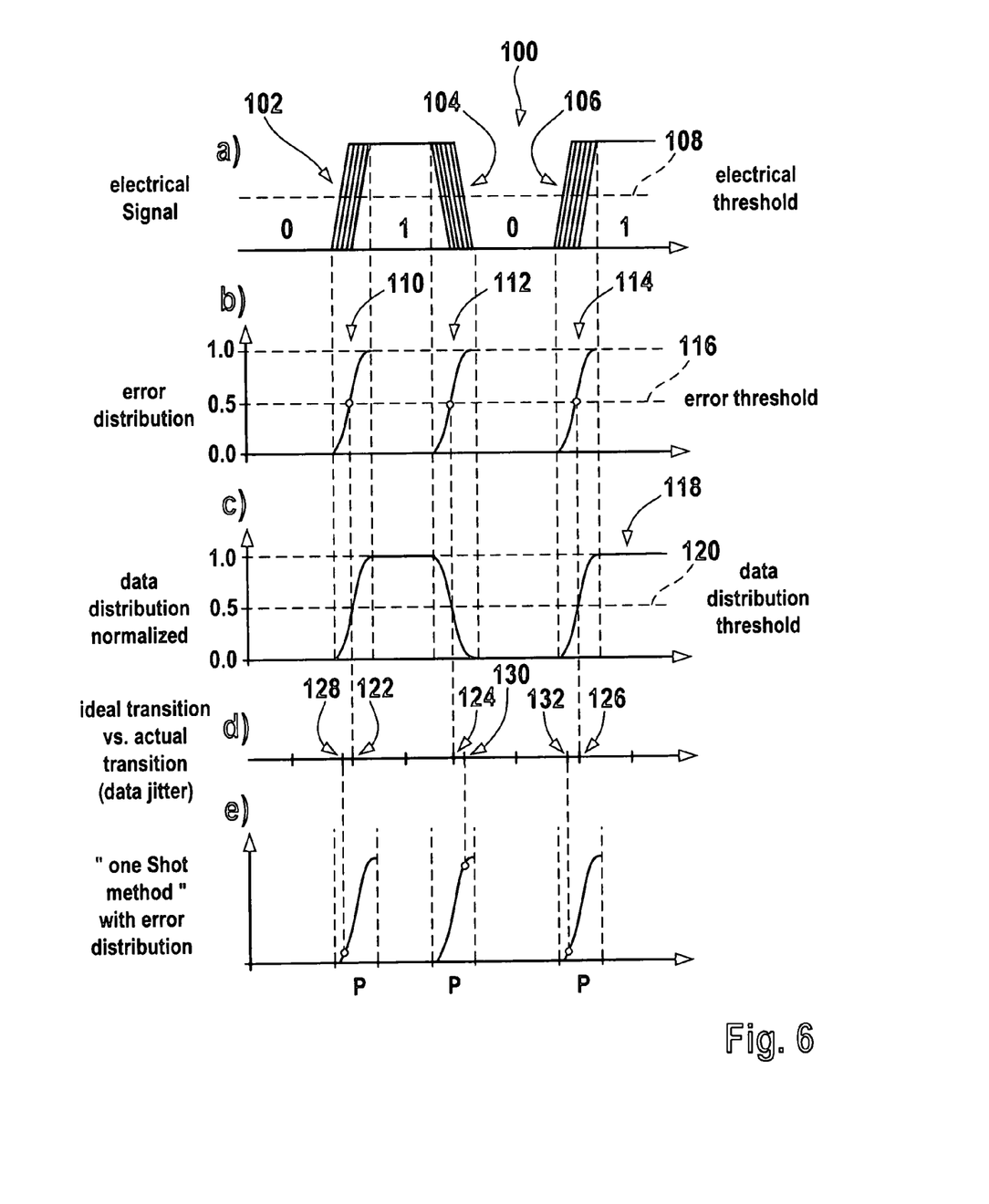
FIG. 6 shows an example of a typical signal course and the processing of the signal according to the invention.

Now, a further method for processing a signal in order to determine jitter of the signal with a repetitive bit pattern is explained with regard to FIG. 6. This method is based on an algorithm implementing a further embodiment of the invention. The idea underlying this algorithm is to avoid the many capture measurements which are costly (stop, upload capture memory, examine capture memory, start again, etc.). Instead, just the error distribution at one transition is measured, for example by masking out the bits of all other transitions and using BER counters. The so measured error distribution serves as a pattern error distribution for determining the most likely transition points.

This method does not require stop/start steps, so that measurements to very deep BER levels may be performed. After the detailed measurement of one transition, only samples at one sample point of the other transitions are required in order to determine their most likely transition points. Typically, a sample point for taking a sample is placed at about the middle of a transition to be measured. Then, a capture measurement with as many bits as possible or necessary is done. After that, the BER for the transition at the sample point is calculated. Finally, the pattern error distribution is used to find out the deviation of the individual transitions from the one transition measured in detail in order to determine the position of the most likely transition point of the transition measured at only one sample point.

This method may be called the "one-shot" method since a point of the most likely transition for a transition in the signal may be determined without completely "scanning" the transition by shifting the sample point over the transition, but only by taking samples from the transition at one sample point, and determining the position of the most likely transition point of the measured transition with regard to the pattern error distribution which was measured in detail. The typical error distribution may be determined by "scanning" one transition, for example by masking out the expected bits of all other transitions. The advantage of this method is that measurement to very deep BER levels may be performed. In the following, this method is explained in detail.

In the diagram a) at the top of FIG. 6, an electrical signal 100 with a repetitive bit pattern " . . . 0101 . . . " is shown. The signal 100 may be the output signal of a digital transmission system and may have a bit rate in the range of several GB/s. Thus, jitter significantly influences the determination of the bit pattern contained in the received signal 100. As can be seen, the rising edges 102 and 106 and the falling edges 104 of the signal contain jitter. For determining the logical value of a bit contained in the signal, each bit is sampled and the sample is compared with an electrical threshold 108.

Now, for each sample point, as a value the BER may be calculated from the samples taken at this sample point. The calculated BERs over the sample points may be used as a distribution for the further analysis of the signal. Diagram b) shows the error distribution 100, 112, and 114 for each of the transitions 102, 104, and 106, respectively, which may be determined as described above. The error threshold is chosen at 0.5 in order to determine the most likely transition point for each transition 102, 104, and 106. However, as explained above, the error threshold may also be chosen at another point such as 0.25 or 0.33.

Instead of calculating the BER at each sample point and determining the error distribution for each bit, the taken samples at each sample point can be summed. The summed values over the sample points represent a data distribution of each bit. A data distribution may be used as the error distribution for further analyzing the signal for jitter. The normalized data distribution 118 as an alternative distribution of calculated values is shown in diagram c). Diagram d) shows the most likely transition points 122, 124, and 126 of the transitions 102, 104, and 106, respectively.

If the course of at least one typical error distribution such as 110, 112, or 114 of diagram b) is known, it is possible to determine the most likely transition point of a transition with jitter by taking one sample of the transition and determining the position of the sample on the course of the error or data distribution. This is called the "one-shot" method since only one sample is taken from a transition in contrast to "scanning" a transition with several shifted sample points. Diagram e) demonstrates the "one-shot" method by means of a typical error distribution: from each transition 102, 104, and 106, only one sample is taken. Then the position of the sample on the typical error distribution is determined, as shown in diagram e). From the position of each taken sample 128, 130 and 132 on the typical error distribution, it is possible to calculate the most likely transition point for each transition 102, 104, and 106.

It should be noted that the "one-shot" method delivers only exact results if the course of the typical error distribution is not too steep, or in other words if it is flat enough for calculating the most likely transition point. If a BER of about 0.0 or about 1.0 is measured at a sample point, it is possible to shift the sample point left or right, respectively, by the width of the typical error distribution. The shifting may be repeated as long as a BER is achieved which differs from the measured 0.0 or 1.0, respectively, so that the "one-shot" method delivers an exact result. Of course this may be also performed by using a typical data distribution instead of a typical error distribution.

By applying the "one-shot" method, less memory is required than with the above describe method with which transitions are "scanned" with shifting sample points and a lot of samples are taken from the "scanned" transitions. However, the "one-shot" method may not be as accurate as the "scanning" method since the most likely transition point is more or less approximated by means of a typical error distribution pattern. For example, if the real error distribution of a transition significantly differs from the error distribution pattern used for the calculation of the most likely transition point, the calculated most likely transition point can deviate from the real most likely transition point which reduces the accuracy of determining jitter in the analyzed signal.

What is claimed is:

1. A method for identifying a jitter component of a digital signal with a repetitive bit sequence of a plurality of bits, comprising:
   determining a distribution function of a transition within the repetitive bit sequence, by:
   a) setting a sample point at a first sampling position relative to the first transition,
   b) assigning a set of digital values to comparison results of the digital signal with a threshold for a plurality of repetitions of the repetitive bit sequence,
   c) determining a distribution value on the base of the sum of assigned digital values,
   d) shifting the sample point by a time increment,
   e) iteratively repeating steps b) to d) until the sample point has reached a second sampling position relative to the transition, and
   f) determining from the distribution values a distribution function over the sample points, and
   determining for each distribution function an intersection point,
   identifying a latest time value and an earliest time value of all rising transitions, and determining a first absolute time difference therefrom,
   identifying a latest time value and an earliest time value of all falling transitions, and determining a second absolute time difference therefrom, and
   determining an inter symbol interference value by determining the maximum value out of the first absolute time difference and the second absolute time difference.

2. The method of claim 1, further comprising
   identifying a first mean value of the time deviation values of all rising transitions,
   identifying a second mean value of the time deviation values of all falling transitions, and
   determining a duty cycle distortion value by determining an absolute difference of the first mean value and the second mean value.

3. The method of claim 1, wherein shifting the sample point by a time increment is performed by a variable delay element the delay of which is incremented stepwise.

4. The method of claim 1, wherein shifting the sample point is performed by sampling the signal with a sampling rate which has a predetermined fraction of the bit rate.

5. The method of claim 1, wherein each sample is stored in a capture memory and the determination of the distribution functions are performed after taking all samples.

6. The method of claim 1, wherein
   the assigned values of a transition are compared with a known bit value of the digital signal, and
   a bit error ratio —BER— of a number of bit differences in relation to a number of repetitions is determined, in order to obtain the distribution value.

7. The method of claim 1, wherein each sample point is set by automatically aligning it with a transition of the signal.

8. A software program or product, stored on a computer readable medium, for executing the method of claim 1, when run on a data processing system.

9. The method of claim 1, further comprising:
   determining for each distribution function an intersection point with a defined threshold, at 50% of a bit amplitude,
   determining for each intersection point a time deviation value with respect to a corresponding ideal transition time point, wherein the ideal transition time points are equally spaced with a time distance according to the bit rate, and
   identifying the jitter component as a function of the time deviation values.

10. The method of claim 9, further comprising
    identifying a latest time value and an earliest time value out of the determined time deviation values, and
    determining a data dependent jitter by taking the absolute difference between the latest time value and the earliest time value.

11. A method for identifying a jitter component of a digital signal with a repetitive bit sequence of a plurality of bits, comprising:
    determining a distribution function a transition within the repetitive bit sequence, by:
    a) setting a sample point at a first sampling position relative to the first transition,
    b) assigning a set of digital values to comparison results of the digital signal with a threshold for a plurality of repetitions of the repetitive bit sequence,
    c) determining a distribution value on the base of the sum of assigned digital values,
    d) shifting the sample point by a time increment,
    e) iteratively repeating steps b) to d) until the sample point has reached a second sampling position relative to the transition, and
    f) determining from the distribution values a distribution function over the sample points, and
    determining for each distribution function an intersection point,
    wherein the intersection points are chosen to relate to a BER of 50%, so that they relate to most likely transition points.

12. A method for identifying a jitter component of a digital signal with a repetitive bit sequence of a plurality of bits, comprising:
    setting a plurality of sample points at a plurality of sampling positions at ideal transition points,
    assigning each of a set of digital values to comparison results of the digital signal with a threshold for a plurality of repetitions of the bit sequence,
    determining for each sample point a one shot value on the base of the sum of each of the assigned digital values,
    fitting a predetermined distribution function of one transition each to the one-shot-values,
    determining time deviations values by determining the time differences between each one-shot-value and a 50% BER value, and
    identifying the jitter property as a function of the time deviation values.

13. A method for identifying a jitter component of a digital signal with a repetitive bit sequence of a plurality of bits, comprising:

determining a distribution function of a transition within the repetitive bit sequence, by:
   a) setting a sample point at a first sampling position relative to the first transition,
   b) assigning a set of digital values to comparison results of the digital signal with a threshold for a plurality of repetitions of the repetitive bit sequence,
   c) determining a distribution value on the base of the sum of assigned digital values,
   d) shifting the sample point by a time increment,
   e) iteratively repeating steps b) to d) until the sample point has reached a second sampling position relative to the transition, and
   f) determining from the distribution values a distribution function over the sample points,
wherein a determined random jitter is added to one of the: digital signal or a sampling clock, so that the distribution function is stretched with respect to a time axis.

* * * * *